F. D. DRAKE.
Evaporating Pan.

No. 37,339.

Patented Jan. 6, 1863.

Witnesses:

Inventor:

UNITED STATES PATENT OFFICE.

F. D. DRAKE, OF FOUR CORNERS, OHIO.

IMPROVED EVAPORATOR FOR SACCHARINE LIQUIDS.

Specification forming part of Letters Patent No. 37,339, dated January 6, 1863.

*To all whom it may concern:*

Be it known that I, F. D. DRAKE, of Four Corners, in the county of Huron and State of Ohio, have invented a new and Improved Evaporator for Saccharine Liquids; and I do hereby declare that the following is a full, clear, and exact description of the same, reference being had to the accompanying drawings, forming a part of this specification, in which—

Figure 1:
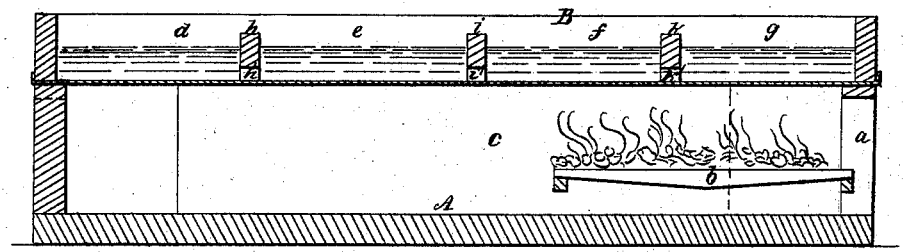
Figure 2:
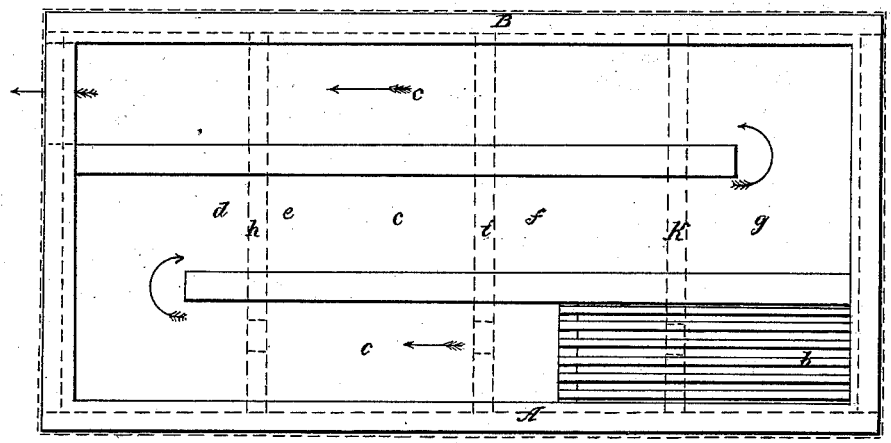
Figure 3:
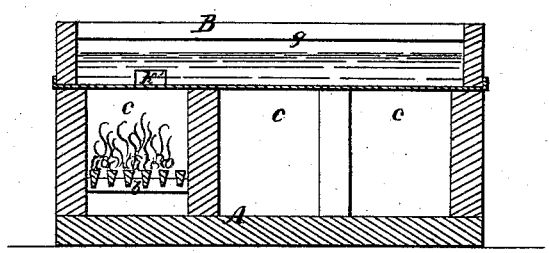

Figure 1 represents a longitudinal vertical section of my invention. Fig. 2 is a transverse vertical section of the same. Fig. 3 is a plan or top view of the furnace, the pan being indicated in red outlines.

Similar letters of reference in all the views indicate corresponding parts.

This invention consists in the arrangement, in combination with an evaporating-pan, of a furnace and flue extending along under the front side and then returning under the center and back again under the rear side of the pan, and out in the chimney in such a manner that the heat applied to the liquid in the pan is graduated from the highest temperature on one side of the pan down to below the boiling-point on the other, and that thereby the scum is thrown off toward the coolest side of the pan, whence it can easily be removed, and the danger of imparting an unpleasant taste to the molasses by boiling the sap in the mass is obviated, and, furthermore, a saving of fuel is effected.

To enable those skilled in the art to make and use my invention, I will proceed to describe it with reference to the drawings.

A represents the furnace, which is built up of brick or any other suitable material, and to which access is had through the fire-door $a$. The fire is made on the grate $b$, and thence a flue, $c$, extends back to the rear end of the furnace, returning through the middle to the front end, and then back again on the opposite side of the furnace to its rear end, where it terminates in the chimney. The course of this flue and of the products of combustion is indicated by arrows in Fig. 3.

B represents the evaporating-pan, which is made of wood, with a sheet-metal bottom, or which may be constructed in any other suitable manner. It is placed on the top of the furnace A, so that its whole bottom, with the exceptions of those portions right over the partition-walls of the flue, is exposed to the heat, and it is divided into a series of compartments, $d\ e\ f\ g$, by partitions $h\ i\ k$, which extend from one side of the pan to the other. The several compartments communicate with each other through openings $h'\ i'\ k'$, which may be closed by gates, so that the current of liquid through them can be regulated. These openings are nearer to one side of the pan than to the other, as clearly shown in Fig. 2 of the drawings, and the pan is placed on the furnace in such a position that said openings are over the hottest part of the furnace or of the flue $c$.

The juice is admitted into the pan at that corner farthest from the grate $b$ and nearest to the chimney where the temperature in the pan is the lowest, and in passing in the compartment $d$ to the opposite or hottest side of the pan the juice is gradually raised to the boiling-heat, and the scum which rises to the surface is thrown back to the coolest part of the pan, where the temperature is below the boiling-point.

By having the openings $h\ i\ k$ on the hottest side of the pan, all the juice is compelled to pass to that side, and in every compartment the scum which rises when the boiling commences is thrown toward the cool side of the pan, where it can readily be removed. By these means all the scum collects on that side of the pan the temperature of which is below the boiling-point, and the danger of imparting an unpleasant taste to the molasses by boiling the scum or acrid matter with the liquid is avoided. Furthermore, by having the scum collected on one side of the pan the labor of removing the same is reduced, and can easily be attended to by one person, whereas with such pans where the scum collects on both sides, it requires two persons to remove the scum, or, if one person attempts to do it, it requires much labor and exertion in running from one side of the pan to the other; and, furthermore, by the arrangement of my flue a considerable saving in fuel is effected, the heat from the fire passing three times the whole length of the pan before escaping at the chimney. In brief, my pan possesses in a great degree the very desirable properties of cheapness and simplicity; it effects a saving in fuel and in labor, and it improves the quality of the article produced.

Having thus described my invention, what I claim as new, and desire to secure by Letters Patent, is—

The arrangement of the flue $c$, extending on one side of the furnace A from front to rear end, then back through the middle to the front end, and back again to the chimney at the rear end of the furnace, in combination with the pan B, constructed and operating substantially as and for the purpose shown and described.

F. D. DRAKE.

Witnesses:
  ALVA ADRIS,
  FREDERICK MESSENGER.